US009008802B2

(12) United States Patent
Park et al.

(10) Patent No.: US 9,008,802 B2
(45) Date of Patent: Apr. 14, 2015

(54) ELECTRICAL INSTRUMENT AND CONTROLLING CONTROL METHOD THEREOF

(75) Inventors: Han Bi Park, Seoul (KR); Dong Seok Cho, Seoul (KR); Min Jin Song, Seoul (KR); Lae He Ham, Goyang-si (KR); Hoon Kim, Suwon-si (KR); Tae Sik Nam, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 662 days.

(21) Appl. No.: 13/401,359

(22) Filed: Feb. 21, 2012

(65) Prior Publication Data

US 2012/0221123 A1     Aug. 30, 2012

(30) Foreign Application Priority Data

Feb. 25, 2011   (KR) .................. 10-2011-0017160

(51) Int. Cl.
  *G05B 11/01*    (2006.01)
  *G05B 15/00*    (2006.01)
  *G04G 15/00*    (2006.01)
  *G04G 21/08*    (2010.01)

(52) U.S. Cl.
  CPC .............. *G04G 15/006* (2013.01); *G04G 21/08* (2013.01)

(58) Field of Classification Search
  USPC ........................................ 700/17, 83
  See application file for complete search history.

(56) References Cited

U.S. PATENT DOCUMENTS

| 8,800,164 | B2 * | 8/2014 | Kim et al. | 34/493 |
| 2009/0295594 | A1 * | 12/2009 | Yoon | 340/825.36 |
| 2011/0258667 | A1 * | 10/2011 | Kim et al. | 725/58 |
| 2012/0101652 | A1 * | 4/2012 | Shin et al. | 700/296 |
| 2012/0215371 | A1 * | 8/2012 | Seo et al. | 700/296 |

\* cited by examiner

*Primary Examiner* — Ronald Hartman, Jr.
(74) *Attorney, Agent, or Firm* — Staas & Halsey LLP

(57) ABSTRACT

A method of controlling an electrical instrument to which a user inputs a reservation time using a rotary dial includes, upon reception of power rates by time periods from a power provider, confirming power rate levels by time periods based on the received power rates, displaying a color window including the power rate levels by time periods around the rotary dial, and displaying the reservation time input by the user through the rotary dial on the clock window. Accordingly, it is possible to provide a user interface that displays power rate information by time periods such that the user intuitively recognizes the power rate information and sets a reservation time on the basis of the power rate information.

28 Claims, 17 Drawing Sheets

FIG. 3

| TIME(sec) | POWER(W) |
|---|---|
| 1 | 7.03 |
| 2 | 7.041 |
| 3 | 7.039 |
| 4 | 7.069 |
| 5 | 7.072 |
| 6 | 7.081 |
| 7 | 67.212 |
| 8 | 38.539 |
| 9 | 11.857 |
| 10 | 11.313 |
| 11 | 11.312 |
| 12 | 21.42 |
| 13 | 21.351 |
| 14 | 21.301 |
| 15 | 21.129 |
| 16 | 20.967 |
| 17 | 20.909 |
| 18 | 20.943 |

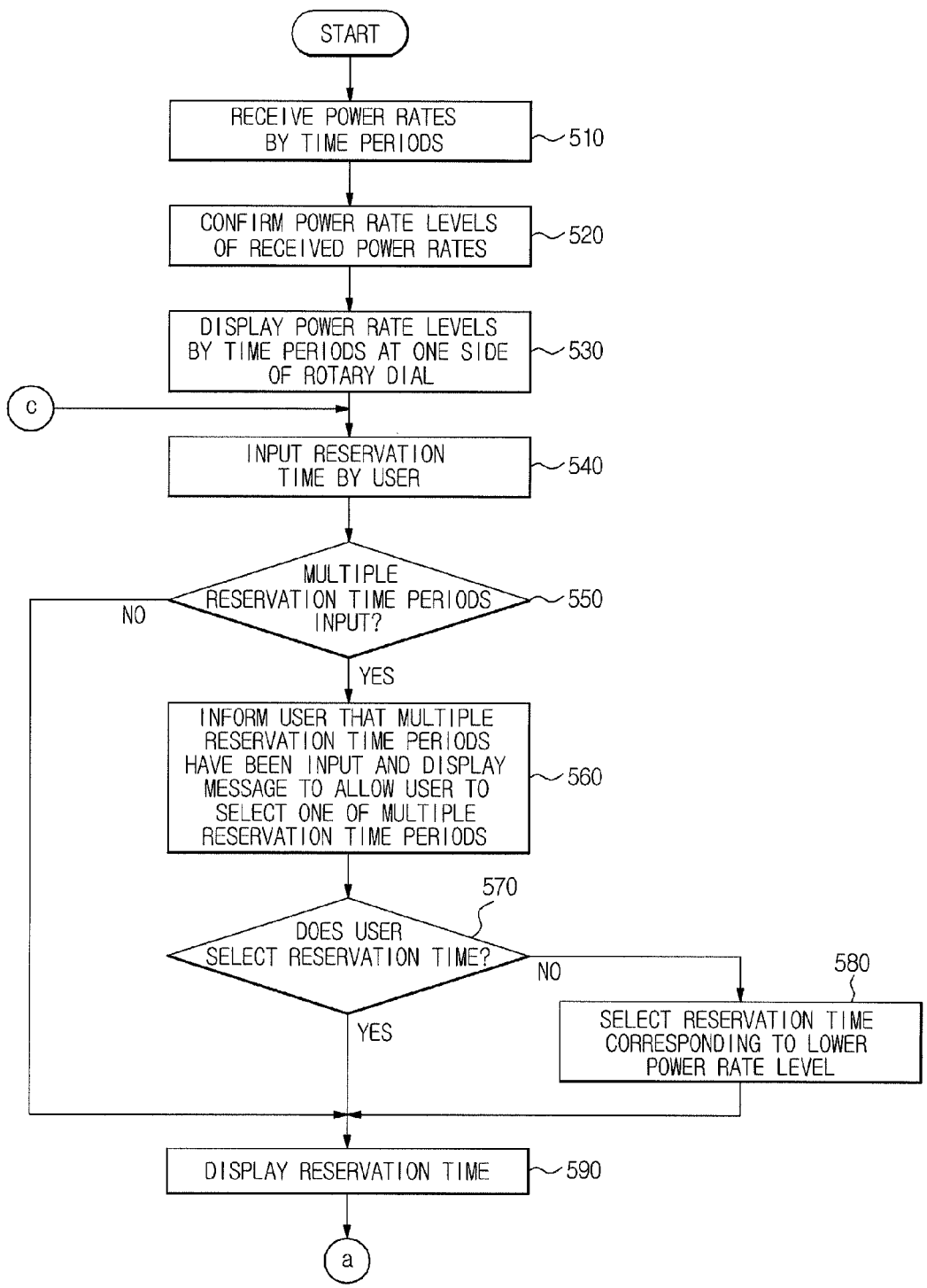

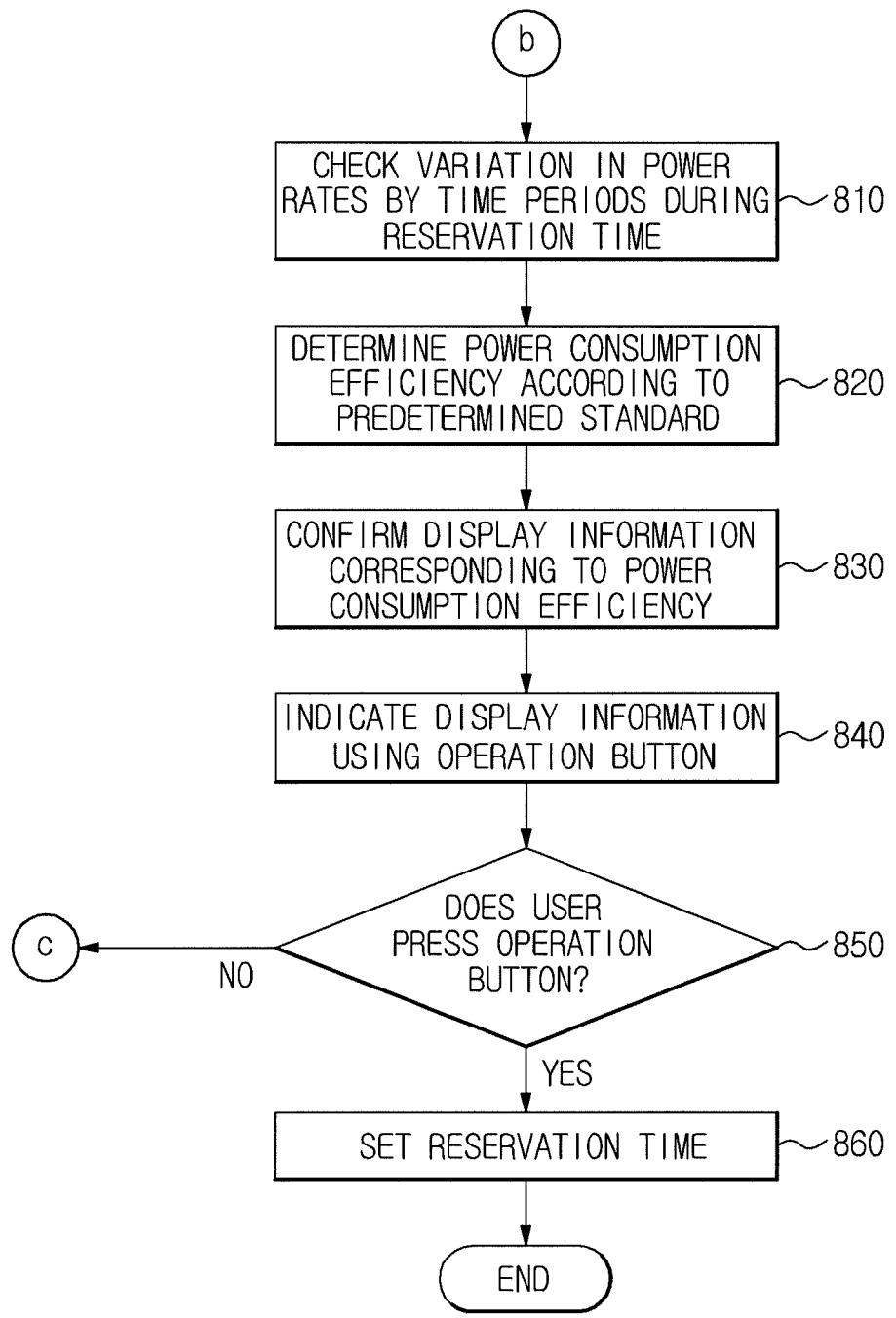

ELECTRICAL INSTRUMENT AND CONTROLLING CONTROL METHOD THEREOF

CROSS-REFERENCE TO RELATED APPLICATIONS

This application claims the benefit of Korean Patent Application No. 2011-0017160, filed on Feb. 25, 2011 in the Korean Intellectual Property Office, the disclosure of which is incorporated herein by reference.

BACKGROUND

1. Field

Embodiments of the present disclosure relate to an electrical instrument and control method thereof to provide power rate information transmitted from a power provider to a user such that the user sets a reservation time on the basis of the power rate information.

2. Description of the Related Art

With the recent rapid increase in the number of devices powered by electricity, power demand increases year by year.

As can be seen from a power demand pattern, peak capacity is not reached during most days of the year, that is to say, power plants only operate at full capacity during a few days out of the year. A state in which a high power demand is required for a short time is called peak load. During periods of peak load, electricity costs the most to generate and deliver, and therefore power providers raise the power rate charged to consumers during periods of peak load. Costs for constructing an additional power plant are extremely high and maintenance costs for power plants constructed to maintain peak load for a short period are considerable.

Recently, numerous developers are conducting intensive research into a demand management method for temporarily restricting power consumption by limiting peak load without constructing such additional power plants. For the aforementioned purposes, demand management is a focus of attention, and a great deal of research is focused upon an advanced demand management format for demand response (DR).

DR is a system for intelligently managing energy consumption depending upon variation in power rates. That is, a consumer uses power in response to power rates rather than according to an ordinary power consumption pattern.

Therefore, electrical instruments to which DR is applied have been developed. The electrical instruments are provided with real-time power rates from a power provider and perform power-saving control based on the power rates.

However, conventional electrical instruments to which DR is applied do not provide power rate level information for each time period when a user sets a reservation time, and thus the user does not have knowledge of a low power rate period. Accordingly, the user may set a reservation time without considering power rates.

SUMMARY

Therefore, it is an aspect of the present disclosure to provide an electrical instrument and control method thereof to display a clock window indicating power rate levels corresponding to respective time periods at one side of a rotary dial such that a user sets a reservation time using the clock window.

It is another aspect of the present disclosure to provide an electrical instrument and control method thereof to calculate estimated power rates corresponding to a reservation time set by a user and display the estimated power rates.

It is another aspect of the present disclosure to provide an electrical instrument and control method thereof to determine power consumption efficiency in consideration of a variation in power rates by time periods during a reservation time and display an operation buffer in a color corresponding to the determined power consumption efficiency.

Additional aspects of the disclosure will be set forth in part in the description which follows and, in part, will be apparent from the description, or may be learned by practice of the disclosure.

In accordance with one aspect of the present disclosure, a method of controlling an electrical instrument to which a user inputs a reservation time using a rotary dial includes: upon reception of power rates by time periods from a power provider, confirming power rate levels by time periods based on the received power rates; displaying a clock window including the power rate levels by time periods around the rotary dial; and displaying the reservation time input by the user through the rotary dial on the clock window.

The clock window may be segmented into regions respectively corresponding to the power rate levels by time periods and the segmented regions may be respectively displayed in colors corresponding to the power rate levels.

The clock window may have a circular or bar shape.

The control method may further include determining whether a plurality of reservation time periods is input; selecting one of the plurality of reservation time periods when it is determined that the plurality of reservation time periods are input; and displaying the selected reservation time.

The selecting of one of the plurality of reservation time periods may include allowing the user to select one of the reservation time periods, comparing power rate levels corresponding to the plurality of reservation time periods and selecting a reservation time corresponding to a lower power rate level if the user does not select any reservation time.

The selecting of one of the plurality of reservation time periods may include comparing power rate levels respectively corresponding to the plurality of reservation time periods and selecting a reservation time corresponding to a lower power rate level.

The control method may further include calculating estimated power rates corresponding to the reservation time using previously stored instantaneous power amounts by operation time periods and the power rates by time periods and displaying the estimated power rates.

The calculating of the estimated power rates may include calculating a desired operation time on the basis of the reservation time; confirming instantaneous power amounts corresponding to the desired operation time; confirming power rates corresponding to the reservation time; and calculating the estimated power rates by adding up products of the instantaneous power amounts and power rates.

The control method may further include determining power consumption efficiency on the basis of a variation in the power rates by time periods during the reservation time according to a predetermined standard; determining a color corresponding to the determined power consumption efficiency; and displaying an operation button in the determined color.

The control method may further include displaying the reservation time with the variation in the power rates by time periods.

The variation in the power rates by time periods may be indicated by a bar graph that shows the power rates by time periods.

The displaying of the operation button in the color may include displaying the entire operation button in the color or displaying only the edge of the operation button in the color.

The rotary dial may be a jog dial or is displayed on a touchscreen.

In accordance with another aspect of the present disclosure, an electrical instrument to which a reservation time is input using a rotary dial includes a memory to store a list of power rate levels corresponding to power rates; a communication unit to receive power rates by time periods from a power provider; a controller to confirm power rate levels by time periods using a power rate level list when receiving the power rates by time periods from the communication unit; and a user interface to display the power rate levels by time periods on a clock window arranged around the rotary dial and display the reservation time input using the rotary dial on the clock window.

The memory may store color information respectively corresponding to the power rate levels by time periods and the user interface may display the power rate levels by time periods on the clock window on the basis of the color information.

The user interface may have a circular or bar shape.

The controller may determine whether a plurality of reservation time periods is input and select one of the plurality of reservation time periods when determining that the plurality of reservation time periods is input, and the user interface may display the selected reservation time.

The controller may compare power rate levels respectively corresponding to the plurality of reservation time periods and select a reservation time corresponding to a lower power rate level.

The controller may determine whether a plurality of reservation time periods is input and allow a user to select one of the plurality reservation time periods when determining that the plurality of reservation time periods are input.

The controller may compare power rates levels respectively corresponding to the plurality of reservation time periods and select a reservation time corresponding to a lower power rate level if no reservation time is selected from the plurality of reservation time periods through the user interface.

The memory may store instantaneous power amounts by operation time periods, the controller may calculate estimated power rates corresponding to the reservation time using the instantaneous power amounts and the power rates by time periods, and the user interface may display the estimated power rates.

The controller may calculate a desired operation time on the basis of the reservation time, confirm instantaneous power amounts corresponding to the desired operation time, confirm power rates corresponding to the reservation time, and calculate the estimated power rates by adding up products of the confirmed instantaneous power amounts and power rates.

The controller may determine power consumption efficiency on the basis of a variation in the power rates by time periods during the reservation time according to a predetermined standard.

The memory may store color display information corresponding to the power consumption efficiency and the user interface may display an operation button in a color corresponding to the determined power consumption efficiency.

The user interface may display the reservation time with the variation in the power rates by time periods.

The variation in the power rates by time periods may be indicated by a bar graph that shows the power rates by time periods.

The user interface may display the entire operation button in the color corresponding to the power consumption efficiency or display only the edge of the operation button in the color.

The rotary dial may be a jog wheel or may be displayed on a touchscreen.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 shows an exemplary list of instantaneous power amounts by operation time periods, stored in a memory;

FIG. 10A is a flowchart illustrating a method of controlling an electrical instrument according to an embodiment of the present disclosure;

FIG. 12 is a flowchart illustrating a method of controlling an electrical instrument to display power consumption efficiency based on a power rate variation during reservation time.

DETAILED DESCRIPTION

Figure 1:
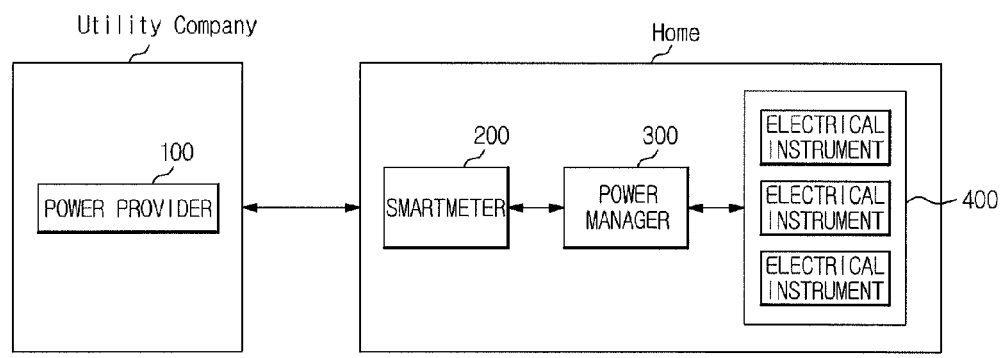
FIG. 1 is a block diagram of a power management system according to an embodiment of the present disclosure.

Reference will now be made in detail to the embodiments of the present disclosure, examples of which are illustrated in the accompanying drawings, wherein like reference numerals refer to like elements throughout.

An electrical instrument and controlling control method thereof according to the embodiments of the present disclosure will now be explained with reference to the attached drawings.

FIG. 1 is a block diagram of a power management system according to an embodiment of the present disclosure.

Referring to FIG. 1, the power management system includes a power provider 100, a smartmeter 200, a power manager 300, and an electrical instrument 400.

The power provider 100 is a power supply source that is driven by a power supply company (utility company) so as to generate and provide power. The power provider 100 generates the power through atomic energy, hydroelectric power, thermoelectric power, wind power, etc., and provides the generated power to the electrical instrument 400 installed in each home.

Here, while the amount of power provided by the utility company is constant, the amount of power consumed in each home varies with time. For example, power consumption at dawn or in the morning is lower than in the afternoon or evening and power consumption in spring and autumn is lower than in summer and winter in each home.

Accordingly, the power provider 100 sets power rates corresponding to a low power consumption period lower than power rates corresponding to a high power consumption period, sets power rates corresponding to a low power consumption season lower than power rates corresponding to a high power consumption season, and provides power at adjusted rates to each home.

That is, the power provider 100 controls power rates of each home to be elastically adjusted in response to power consumption of each home, and provides power at the adjusted power rates to each home, such that supply and consumption of power can be balanced.

The power provider 100 predicts power consumption on the basis of the generated amount of electric power, past power use information for every season and every time period, and weather information, and determines power rates on the basis of the predicted power consumption.

Further, the power provider 100 may establish a power rate level corresponding to the predicted power rates.

The power provider 100 collects power consumption amounts of individual homes classified according to individual power rate levels, and stores the collected power consumption information according to individual power rate levels, such that the power supply company calculates power rates depending upon power consumption for individual power rate levels of each home on a monthly basis, and charges each home the calculated power rates on a monthly basis.

The power provider 100 is connected to the smartmeter 200, the power manager 300, and the electrical instrument 400, installed in each home, over a network, such that the power provider 100 transmits and receives information regarding power demand management over the network. This network may be any of a wired network, a wireless network, a wired/wireless hybrid network, etc.

The smartmeter 200 is installed in each home and includes a display such as a liquid crystal display (LCD), such that power consumed in each home is displayed in real time.

The smartmeter 200 is an electronic meter, which bidirectionally communicates with the power provider 100 and the power manager 300 and transmits the consumed power amount to the power provider 100 and the power manager 300.

The smartmeter 200 receives power rate information from the power provider 100, displays the received power rate information such that users can see the transmitted power rate information and transmits the power rate information to the power manager 300.

In addition, the smartmeter 200 may display power rate levels corresponding to power rate information when receiving the power rate information from the power provider 100.

Here, power rate levels may be set to four levels RTP1 to RTP4 having respective power rates and allowable instantaneous powers. The power rate level RTP1 is the lowest power rate level, and the power rate level RTP4 is the highest power rate level. Power rate level is proportional to power rate.

In addition, the smartmeter 200 may transmit both power rates and power rate level information to the power manager 300 if it receives both the power rates and power rate level information from the power provider 100.

The power manager 300 may also be referred to as a Demand Response (DR) controller.

The power manager 300 communicates with the smartmeter 200, and thus receives the power rates and the power rate levels corresponding to the power rates from the smartmeter 200. In addition, the power manager 300 communicates with the electrical instrument 400, and thus receives information on the electrical instrument 400. The power manager 300 controls the operation of the electrical instrument 400 based on the power rates received from the smartmeter 200 and the information of the electrical instrument 400

The power manager 300 may receive both power rate information and power rate level information if the power provider 100 transmits both the power rate information and power rate level information.

The electrical instrument 400 may include a television receiver, washing machine, drying machine, air conditioner, cook-top, electric oven, etc. and communicates with the power manager 300 and thus the electrical instrument 400 is driven by a user or according to an instruction of the power manager 300. Further, the electrical instrument 400 measures a power amount consumed when driven and transmits the measured power amount to the power manager 300.

In addition, the electrical instrument 400 provides power rate information transmitted from the power manager 300 so as to induce the user to set a reservation time corresponding to a low power rate period.

An electrical instrument including a user interface to display power rates such that the user intuitively recognizes the power rates and makes a reservation of time to use the electrical instrument by means of the user interface and a method of controlling the same will now be explained.

Figure 2:
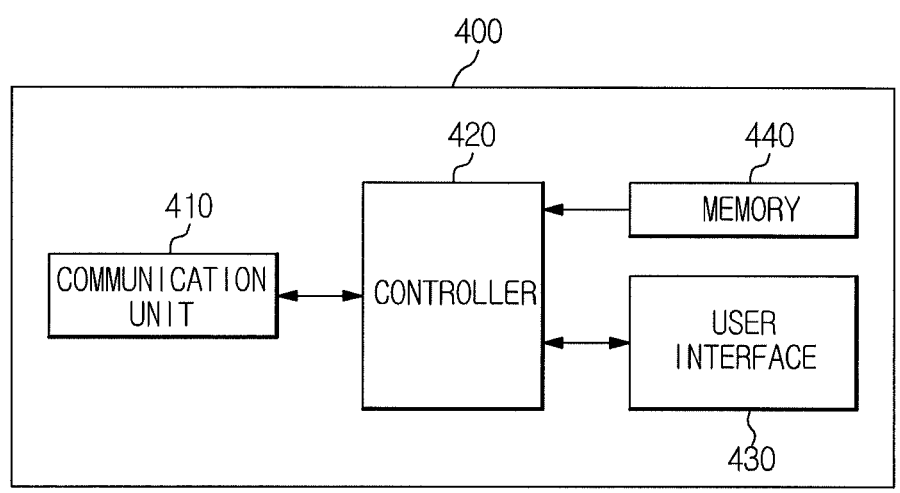
FIG. 2 is a block diagram of an electrical instrument according to an embodiment of the present disclosure

FIG. 2 is a block diagram of the electrical instrument 400 according to an embodiment of the present disclosure.

Referring to FIG. 2, the electrical instrument 400 includes a communication unit 410, a controller 420, a user interface 430, and a memory 440.

The communication unit 410 communicates with the power provider to receive power rate information for each time period from the power provider.

The power rate information for each time period is today's power rate information for each time period or tomorrow's power rate information for each time period and is provided by daily notification or in real time by the power provider.

The communication unit 410 may receive power rate level information for each time period, which corresponds to power rates, in addition to the power rate information for each time period from the power provider.

The controller 420 checks a power rate level for each time period on the basis of the power rate information received from the communication unit 410 and controls the memory 440 to store the power rates and power rate level information by time periods.

Specifically, the controller 420 checks the received power rate level on the basis of a power rate level list previously stored in the memory 440.

Here, the power rate level list is set by the controller 420 and stored in the memory 440 in advance. The controller 420 collects power rate information, arranges the power rate information in order of rate level, classifies the arranged power rate information into a predetermined number of ranges, and respectively provides levels to the ranges so as to generate the power rate level list.

Power rate levels include a plurality of levels which respectively belong to different power rate ranges.

For example, if four power rate levels RTP1 to RTP4 are set, the power rate RTP1 is the lowest power rate level, and the power rate level RTP4 is the highest power rate level. Power rate level is proportional to power rate.

Accordingly, the controller 420 assigns power rate levels to received power rates by time periods and stores the power rate levels in the memory 440 according to the predetermined standard as described above.

Furthermore, the controller 420 controls the power rate levels by time periods to be displayed as different information items such that the user intuitively recognizes the power rate levels. The controller 420 controls the power rate levels by time periods to be displayed through the user interface 430 according to display information previously stored in the memory 440.

In addition, when the user inputs a reservation time including an operation start time and operation end time, the controller 420 controls the reservation time to be displayed on the user interface 430.

The controller 420 sets the operation start time as a reservation registration time on the basis of the input reservation time and calculates a desired operation time from a difference between the operation start time and operation end time.

Further, the controller 420 checks whether or not reservation is repeated when the user inputs a reservation time and generates a repeated reservation event when reservation is repeated.

Specifically, the controller 420 displays a message indicating that reservation is repeated when two or more reservations are made per day so as to provide the user an option or determines a reservation time corresponding to a lower power rate level.

In addition, the controller 420 calculates estimated power rates corresponding to the reservation time on the basis of the power rate information for each time period and an instantaneous power amount for each operation time, stored in the memory 440, and displays the estimated power rates.

Here, a list of instantaneous power amounts by operation time periods, stored in the memory 440, is shown in FIG. 3.

Referring to FIG. 3, the list of instantaneous power amounts by operation time periods, consumed by the electrical instrument, is stored in the memory 440. For example, after 10 seconds from when the electrical instrument operates, the electrical instrument consumes instantaneous power of 11.313 W. While FIG. 3 shows the instantaneous power amounts in seconds, the instantaneous power amounts may be stored in minutes.

Actual instantaneous power amounts consumed by the electrical instrument 400 are detected by measuring power consumed by the electrical instrument 400 in real time when the electrical instrument 400 operates and transmitting the measured power to the controller 420. The detected instantaneous power amounts may be transmitted to the memory 440 and stored in a list of instantaneous power amounts respectively corresponding to operation time periods by operation modes.

The instantaneous power of the electrical instrument 400 is calculated using a voltage across both terminals of an AC power line connected to a power connector of the electrical instrument 400 and current detected from one of AC power lines connected to the power connector.

Accordingly, the controller 420 confirms the instantaneous power amount list on the basis of the calculated desired operation time, confirms the power rates corresponding to the reservation time, and calculates estimated power rates by adding up products of the confirmed instantaneous power amounts and power rates.

For example, if the desired operation time is 30 minutes and reservation registration time is 1:00 p.m., the controller 420 confirms instantaneous power amounts corresponding to 30 minutes and power rates corresponding to the periods from 1:00 p.m. to half past 1:00 p.m. Then, the controller 420 calculates estimated power rates by adding up products of instantaneous power amounts by time periods and power rates.

Accordingly, the user is given a chance to adjust the reservation time since the user knows power rates, which will be charged when the electrical instrument is driven at the set reservation time, in advance.

Furthermore, the controller 420 determines power consumption efficiency on the basis of the power rate information by time periods stored in the memory 400 and the reservation time and controls the power consumption efficiency to be displayed to the user.

The controller 420 calculates power rate variations by time periods during the reservation time and determines the power consumption efficiency according to the standard previously stored in the memory 440.

The controller 420 controls the determined power consumption efficiency to be displayed as display information corresponding thereto, previously stored in the memory, by means of an operation button such that the user intuitively recognizes the power consumption efficiency.

Accordingly, the user is able to determine whether to complete setting of reservation time in consideration of the power consumption efficiency.

The user interface 430 receives an instruction from the user and outputs information corresponding to an instruction of the controller 420.

The user interface 430 may be implemented as a button or a jog wheel that is one of pointing devices to receive instructions from the user and a liquid crystal display (LCD), plasma display panel (PDP), or organic light emitting diode (OLED) to display images. Further, the user interface 430 may be implemented as a touchscreen serving as both an input and output device.

When the user interface 430 is implemented as the touchscreen, the user interface 430 includes a touch panel to sense user touch, recognizes the position and moving direction of a touch sensed by the touch panel, the number of touches, etc. and provides the recognized information to the controller 420.

To achieve this, the user interface 430 senses a touch input and provides sensed touch point information to the controller 420. Specifically, the user interface 430 senses touch inputs according to touch of a user's finger or a tool and cancellation of touch and transmits coordinates corresponding to a touch point to the controller 420.

For example, if the user interface 420 is implemented as a capacitive type touch panel, capacitance switches such as condensers are arranged pixel by pixel in the touchscreen to detect capacitance variation. Further, the user interface 430 allocates coordinates used to confirm touch sensing regions by pixels and stores the coordinates in the memory.

When the capacitance of the touchscreen is varied according to touch applied thereto, the user interface 430 determines a capacitance switch from which the capacitance variation due to the touch is sensed and transmits coordinates corresponding to the capacitance switch to the controller 420.

The user interface 430 according to the current embodiment of the disclosure receives commands from the user through a rotary dial that is one of graphic user interfaces using a pointing device.

Here, the rotary dial may be implemented in the form of a jog wheel or implemented on a touchscreen.

When the user inputs a reservation time of the electrical instrument 400 through the user interface 430 by operating the rotary dial, the user interface 430 displays reservation instructions according to the input reservation time and receives information corresponding to the reservation instructions.

Specifically, the user interface 430 displays a clock window including power rate levels by time periods at one side of the rotary dial and displays the reservation time input by the user on the clock window.

The user interface 430 displays power rate level information on the clock window based on display information corresponding to the power rate levels by time periods. Here, the display information is previously stored in the memory 440 and may be color information based on power rate levels.

Specifically, the user interface 430 divides the clock window into predetermined regions according to the power rate level information and displays the regions in colors corresponding to previously stored power rate levels. That is, the user interface 430 displays power rate levels in different colors.

An operation of inputting a reservation time through the user interface 430 will now be explained with reference to FIGS. 4A and 4B.

Figure 4A:
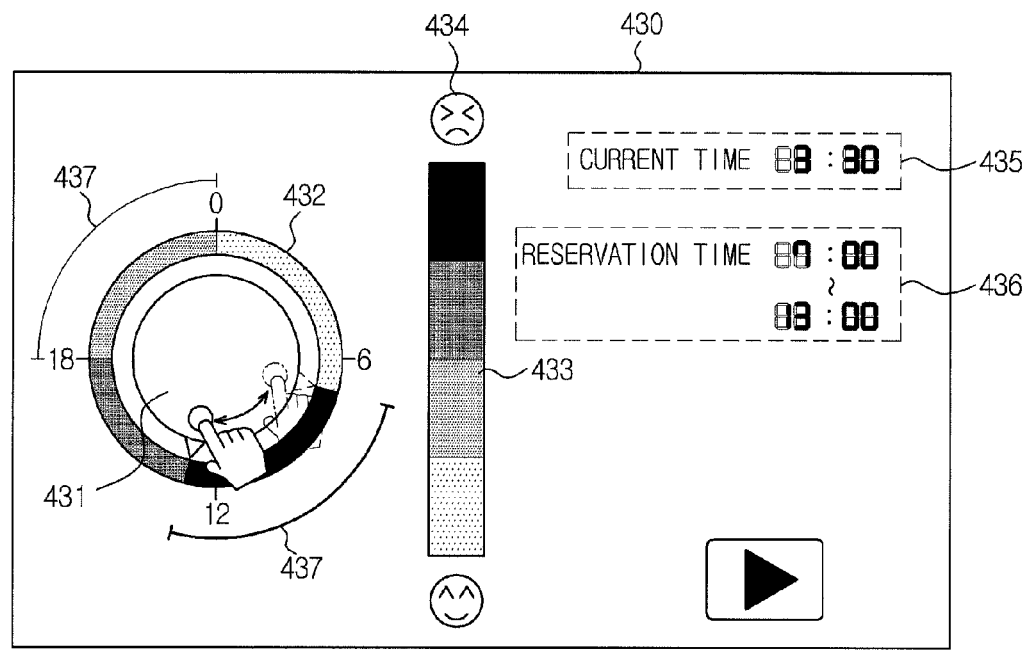
FIG. 4A shows an exemplary screen of a user interface to set a reservation time using a rotary dial.

Referring to FIG. 4A, the user interface 430 displays a circular clock window 432 around a rotary dial 431. The clock window 432 may be arranged around the rotary dial 431, as shown in FIG. 4A, or at the side of the rotary dial 431.

The circular clock window 432 is displayed in colors respectively corresponding to power rate levels by time periods. For example, power rate levels RTP1, RTP2, RTP3 and RTP4 may be respectively displayed in green, yellow, orange and red. Accordingly, a region of the clock window 432, which corresponds to the current time 03:30, is displayed in green.

The colors of the clock window 432 may depends on the number of power rate levels and may be changed by color display information input by the user.

Furthermore, the user interface 430 may display color information 433 in the form of a bar at one side of the circular clock window 432 such that the user intuitively recognizes power rate levels and arrange emoticons 434 at the side of the color information bar 433. For example, a smiley is displayed in proximity to a green region of the color information bar 433 to indicate a low power rate level and frowning emoticon is displayed in proximity to a red region of the color information bar 433 to indicate a high power rate level, as shown in FIG. 4A.

While the emoticons 434 indicating facial expressions are shown in FIG. 4A, emoticon "\" may be displayed. In this case, the number of displayed emoticons increases as the power rate level increases so as to indicate power rate levels.

The user makes a reservation of time to use the electrical instrument on the basis of the power rate level information displayed on the above-described clock window 432.

Specifically, if the user interface 430 is implemented as the jog dial 431, the user makes a reservation of time to use the electrical instrument by pressing and rotating the jog dial 431.

The user inputs a reservation registration time (dotted-line arrow) by rotating the jog dial 431 until an indicator (arrow) of the jog dial 431 indicates a desired operation start time (dotted-line arrow) and pressing the jog dial 431 when the indicator reaches the operation start time (dotted-line arrow). In addition, the user inputs a reservation time by rotating the jog dial 431 from the reservation registration time (dotted-line arrow) until the indicator (arrow) indicates a desired operation end time (solid-line arrow) and pressing the jog dial 431 when the indicator reaches the operation end time (solid-line arrow).

If the user interface 430 is implemented as the rotary dial 431 on a touchscreen, the user rotates a finger to move the indicator so as to input a reservation time.

In case of the rotary dial 431 on the touchscreen, an operation start time and operation end time are input by user's touch.

Since the indicator (arrow) of the rotary dial 431 may not pinpoint a time, the user interface 430 may display the time (436) corresponding to the point indicated by the indicator (arrow) such that the user easily selects the time.

Upon input of the reservation time by the user, the user interface 430 displays the reservation time 437 around the clock window 432. While the reservation time 437 is displayed in such a manner that the operation start time (dotted-line arrow) and operation end time (solid-line arrow) are indicated and connected with a line along the circumference of the clock window 432 in the current embodiment, the reservation time 437 may be displayed in other forms.

Figure 4B:
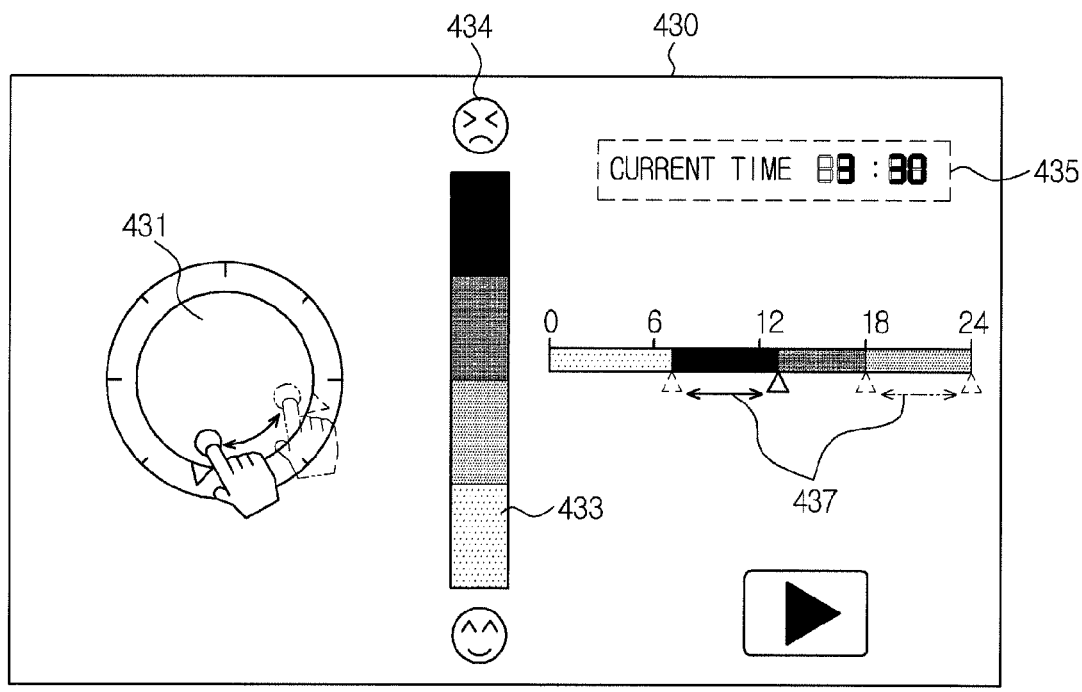
FIG. 4B shows another exemplary screen of the user interface to set a reservation time using the rotary dial.

As shown in FIG. 4B, a bar-type clock window is displayed at the side of the rotary dial 31 and the current time (03:30) is indicated (435).

This bar-type clock window is displayed in colors respectively corresponding to power rate levels such that the user recognizes power rate level variation with time.

The bar-type clock window 432 includes a moving bar moved by operating the rotary dial 431. Accordingly, the user may input a reservation time by rotating the rotary dial 431 to move the moving bar to the left or right.

Furthermore, when a plurality of reservation time periods is input, the user interface 430 informs the user that the plurality of reservation time periods are set and gives the user an option or determines a reservation time corresponding to a lower power rate level and displays the determined reservation time.

Figure 5A:
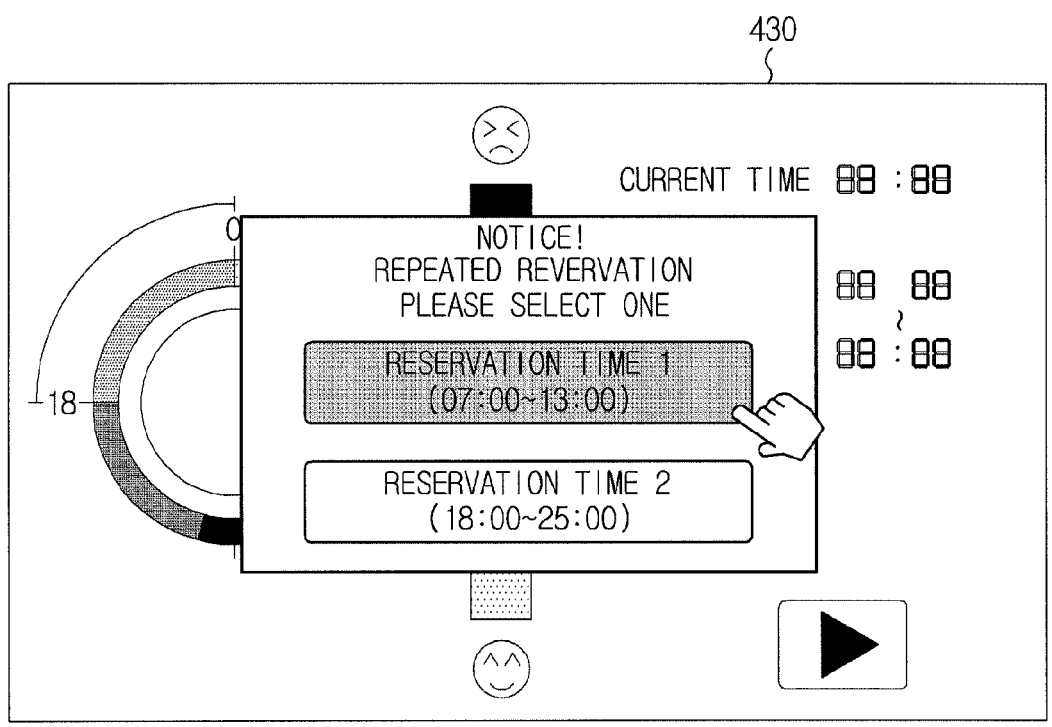
FIGS. 5A, 5B and 5C show exemplary screens of the user interface displayed when a plurality of reservation time periods is input.
Figure 5B:
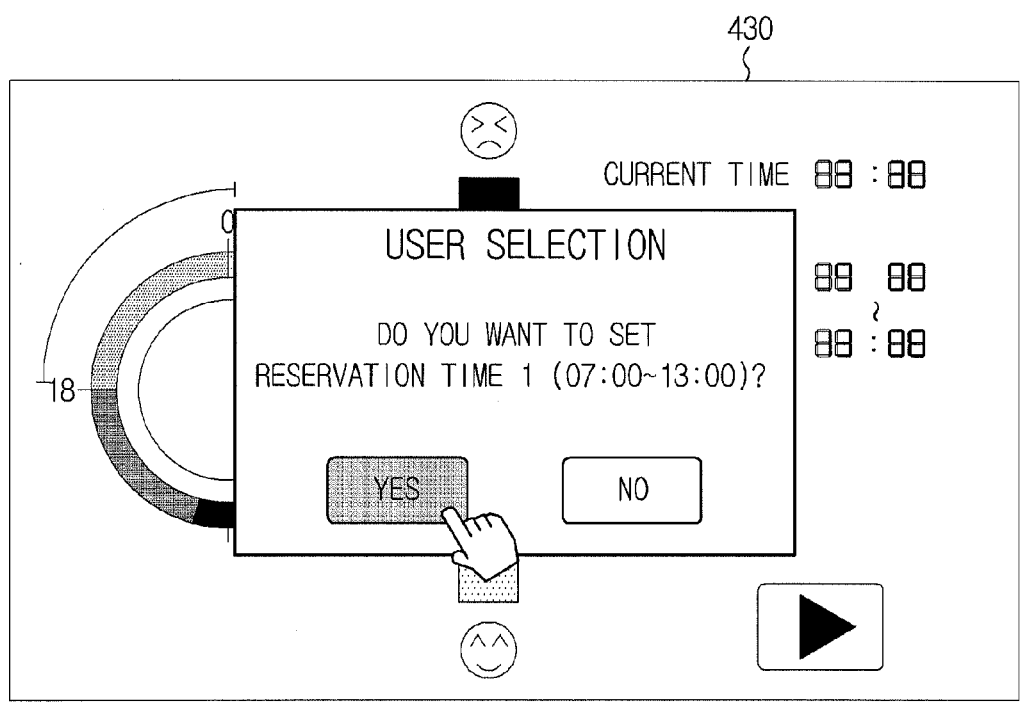
Figure 5C:
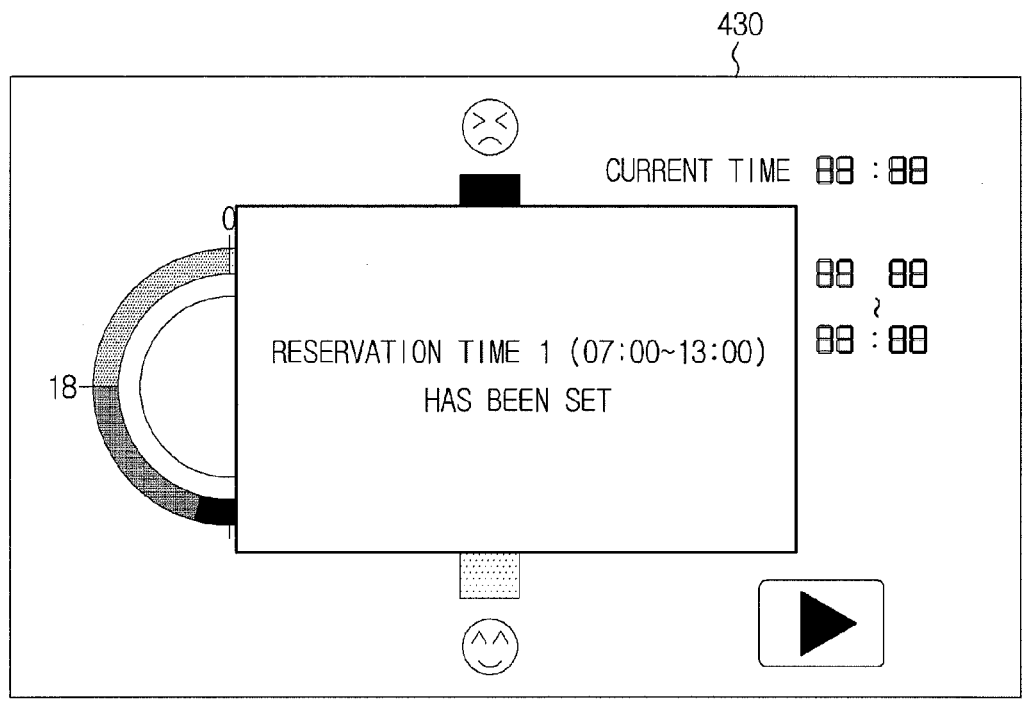

The user interface 430 in the case where the user is given an option is illustrated in FIGS. 5A, 5B and 5C.

Referring to FIGS. 5A, 5B and 5C, the user interface 430 informs the user that a plurality of reservation time periods is set and displays a message such that the user selects one of the plurality of reservation time periods (refer to FIG. 5A). Here, the user interface 430 displays a message that informs the user that a reservation time selected by the user has been set when the user selects the reservation time from the plurality of reservation time periods and displays a message that informs the user that a reservation time corresponding to a lower power rate level has been set when the user does not select any reservation time (refer to FIGS. 5B and 5C).

Figure 6:
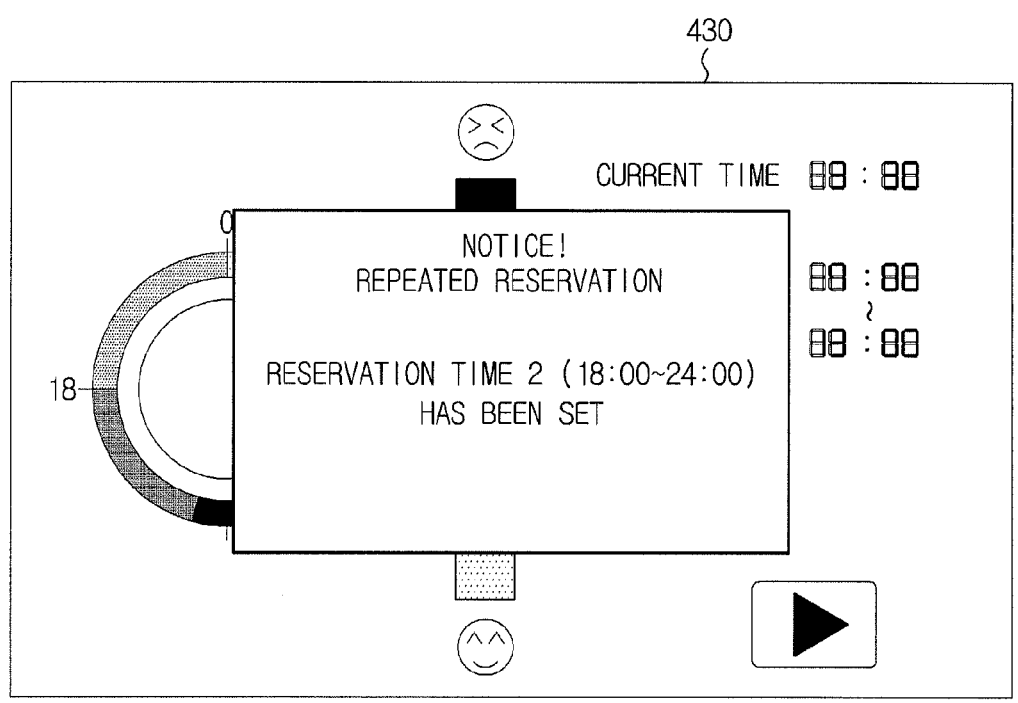
FIG. 6 shows another exemplary screen of the user interface displayed when a plurality of reservation time periods is input.

The user interface 430 in the case where the reservation time corresponding to a lower power rate level is set is illustrated in FIG. 6.

Referring to FIG. 6, the user interface 430 notifies the user that a plurality of reservation time periods has been set and, simultaneously, displays a selected reservation time.

Figure 7:
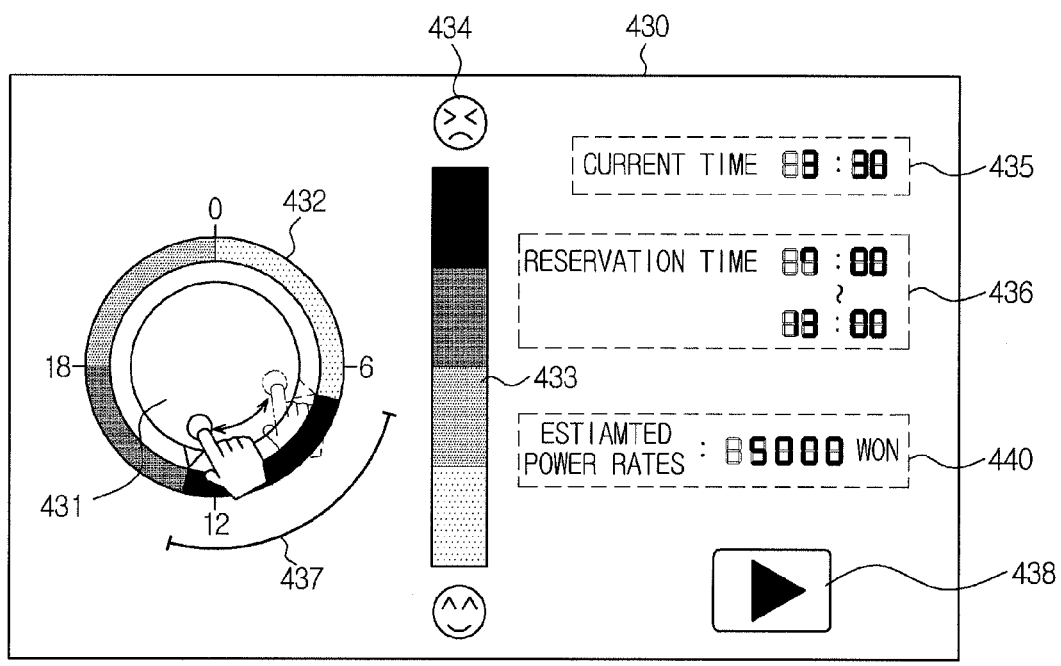
FIG. 7 shows an exemplary screen of the user interface to display estimated power rates corresponding to a reservation time.

Upon setting of the reservation time, the user interface 430 displays power rates 440 estimated when the electrical instrument is driven for the set reservation time, as shown in FIG. 7.

In addition, the user interface 430 displays power consumption efficiency according to the power rate variation during the reservation time by means of the operation button 438.

More specifically, the user interface 430 displays the operation button 438 in a color corresponding to the power consumption efficiency determined by the controller 420.

If the operation button 438 is displayed in red, it indicates low power consumption efficiency. That is, the color information corresponding to the power consumption efficiency may be determined such that it is identical to the colors of power rate levels described with reference to FIGS. 4A and 4B. Otherwise, the color information may be input by the user such that the color information is different from the colors of power rate levels.

Figure 8A:
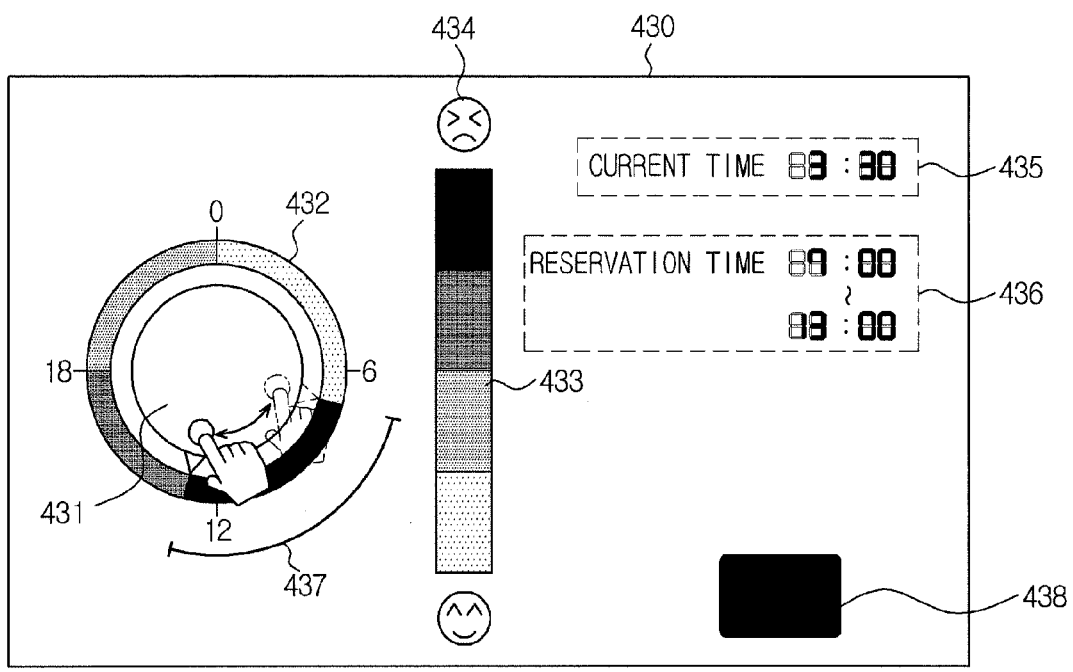
FIG. 8A shows an exemplary screen of the user interface to display power consumption efficiency based on power rate variation during a reservation time on an operation button.
Figure 8B:
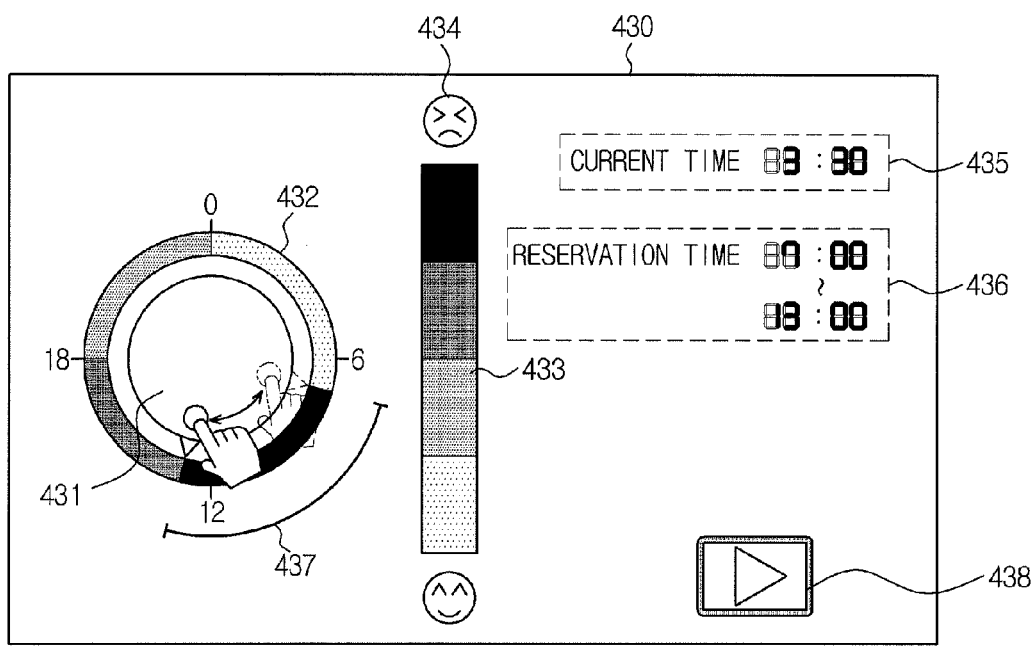
FIG. 8B shows another exemplary screen of the user interface to display power consumption efficiency based on power rate variation during reservation time on the operation button.

The entire operation button 438 may be displayed in the color corresponding to the power consumption efficiency, as shown in FIG. 8A, or only the edge of the operation button 438 may be displayed in the color, as shown in FIG. 8B.

The user interface 430 displays the power consumption efficiency as a color of the operation button 438 such that the user determines whether to complete setting of reservation time using the operation button 438. In addition, the user interface 430 displays a reservation time 439b on a power rate variation graph 439a, as shown in FIG. 9, so as to provide a power rate variation 439 during the reservation time to the user.

Figure 9:
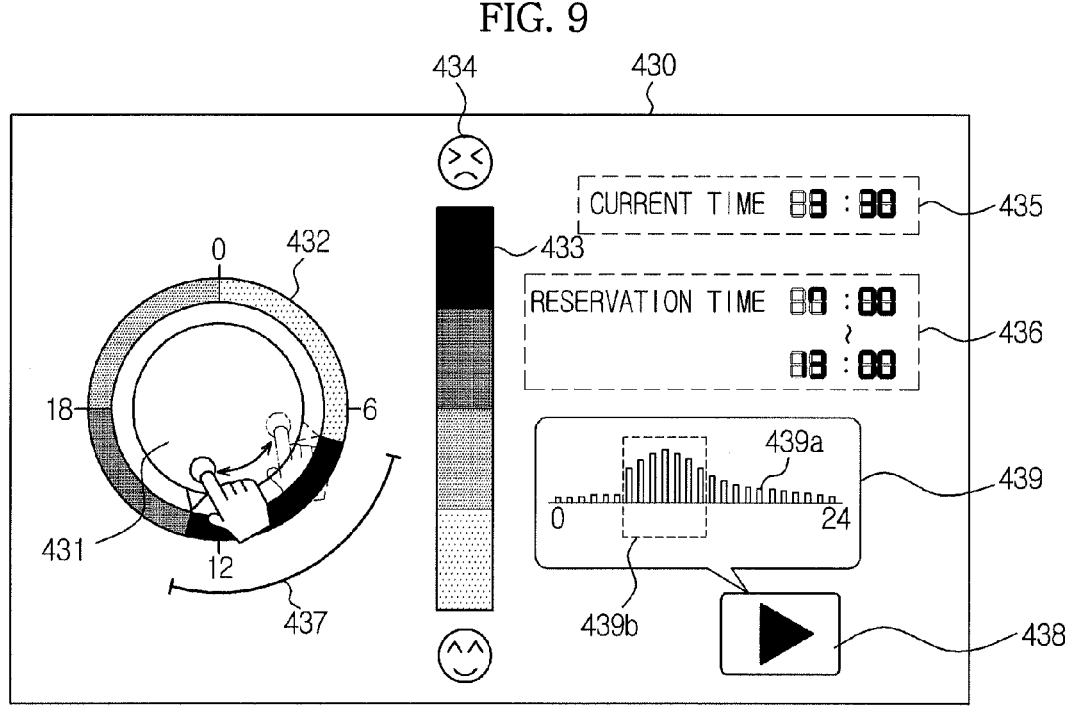
FIG. 9 shows an exemplary screen of the user interface to display a combined form of power rate variations by time periods and reservation time.

Referring to FIG. 9, the power rate variation graph 439a is a bar graph which shows power rate values according to time and the reservation time 439b may be indicated by a dotted line on the bar graph.

Figure 10B:
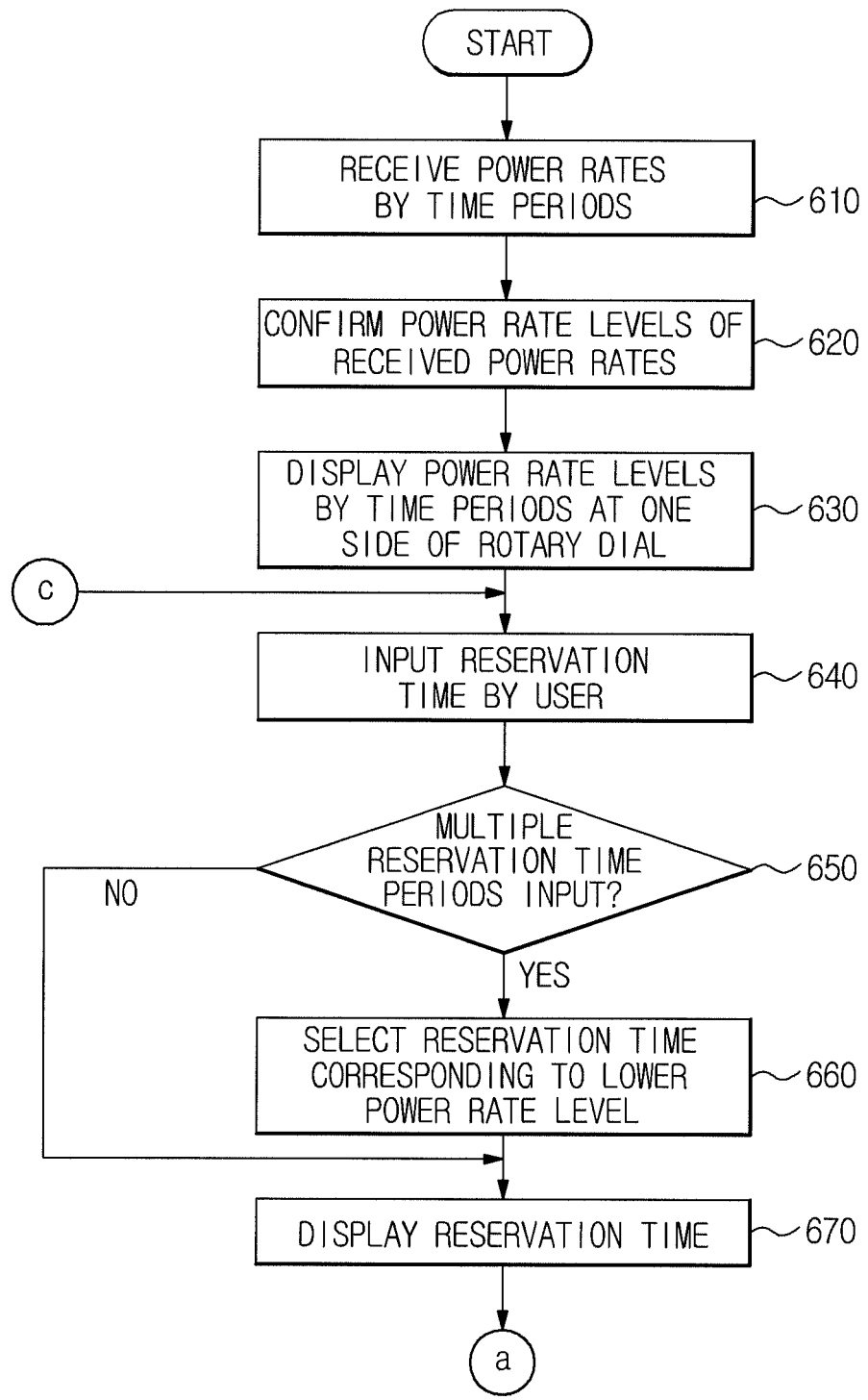
FIG. 10B is a flowchart illustrating a method of controlling an electrical instrument according to another embodiment of the present disclosure.

FIGS. 10A and 10B are flowcharts illustrating a method of controlling the electrical instrument according to another embodiment of the present disclosure.

Referring to FIGS. 10A and 10B, power rate information for each time period is received from the power provider through the communication unit in operation 510. Upon reception of the power rate information corresponding to each time period, the controller assigns the power rate information a power rate level according to a predetermined standard and checks the power rate level of the received power rate information in operation 520.

Then, the controller controls a power rate level variation with time to be displayed on one side of the rotary dial of the user interface in operation 530.

When the user inputs a reservation time by rotating the rotary dial, the controller displays the reservation time in operation 540.

Upon input of the reservation time by the user in operation 540, the controller determines whether a plurality of reservation time periods is input in operation 550.

If the controller determines that the plurality of reservation time periods is input in operation 550, the controller informs the user of input of the plurality of reservation time periods in operation 560 and displays a message that allows the user to select one of the plurality of reservation time periods in operation 570.

Here, if the user selects a reservation time within a predetermined time in operation 570, only the selected reservation time is displayed and unselected reservation time is not displayed in operation 590.

If the user does not select any reservation time within the predetermined time in operation 570, the controller selects a reservation time corresponding to a lower power rate level from the plurality of reservation time periods in operation 580 and controls the selected reservation time to be displayed in operation 590.

If it is determined that the plurality of reservation time periods are input in operation 650, as shown in FIG. 10B, the controller may select a reservation time corresponding to a lower power rate level in operation 660 and display only the selected reservation time in operation 670.

Figure 11:
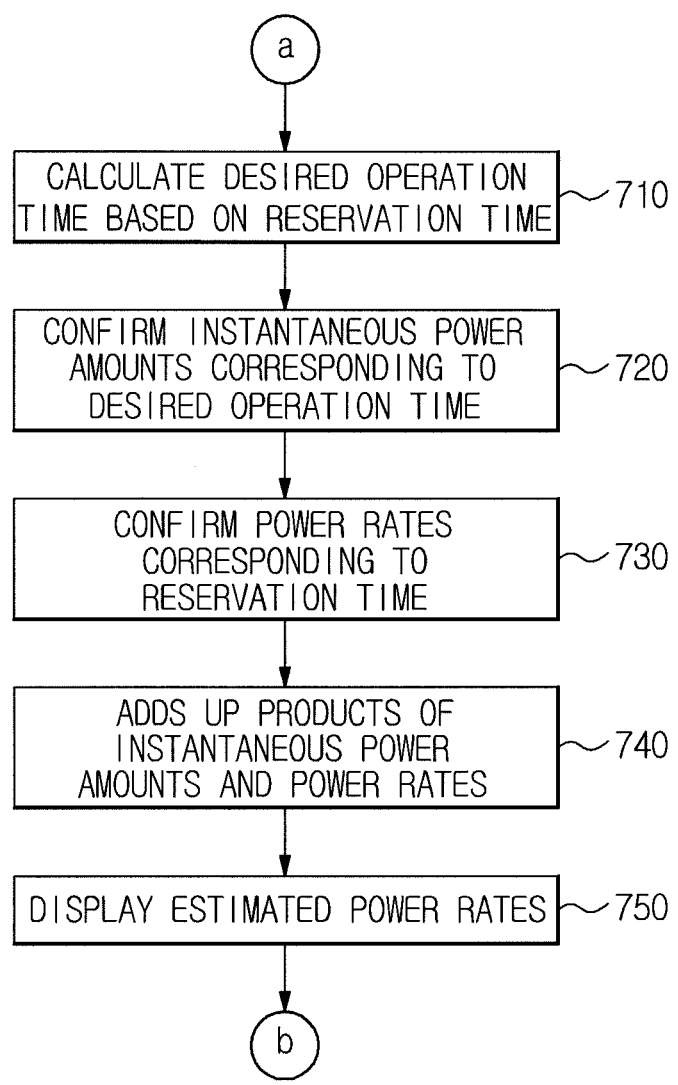
FIG. 11 is a flowchart illustrating a method of controlling an electrical instrument to display estimated power rates corresponding to a reservation time.

As illustrated in FIGS. 10A and 10B, when the reservation time input by the user and displayed through the user interface, the controller may calculate power rates estimated when the electrical instrument is driven for the reservation time and display the estimated power rates, as illustrated in FIG. 11.

Specifically, the controller calculates a desired operation time based on the input reservation time in operation 710. The controller confirms an operation start time and operation end time based on the reservation time and calculates the desired operation time from a difference between the operation start time and operation end time.

Upon calculation of the desired operation time, the controller checks instantaneous power amounts according to operation time, previously stored in the memory, in operation 720 and confirms power rates corresponding to the reservation time in operation 730.

When the instantaneous power amounts and power rates are confirmed in operations 720 and 730, the controller adds up products of the instantaneous power amounts and power rates to calculate estimated power rates in operation 740.

The estimated power rates are displayed on the user interface in operation 750 such that the user is able to determine whether to change the reservation time.

When the reservation time is input by the user, the user interface displays power consumption efficiency determined on the basis of power rate variation during the reservation time as color information by means of the operation button to allow the user to determine whether to finally set the reservation time, as shown in FIG. 12.

Referring to FIG. 12, the controller checks the power rate variation during the reservation time in operation 810 and determines the power consumption efficiency according to a predetermined standard in operation 820.

The power consumption efficiency determination standard may be set differently for electrical instruments. Specifically, the power consumption efficiency may be determined focusing on user convenience rather than power rates in consideration of use of the electrical instrument or focusing on power rates in consideration of energy saving. Otherwise, the power consumption efficiency may be determined according to weights in consideration of both the use of the electrical instrument and energy saving. Here, the weights may be set differently for electrical instruments in advance or input by the user.

In the case where the power consumption efficiency is determined in consideration of energy saving, the controller sets low power consumption efficiency if the power rates corresponding to the reservation time are kept high or gradually increase and sets high power consumption efficiency if the power rates corresponding to the reservation time are kept low or gradually decrease.

Upon determination of the power consumption efficiency, the controller confirms display information corresponding to the power consumption efficiency on the basis of display information previously stored in the memory in operation 830 and displays the confirmed display information using the operation button in operation 840.

When the user recognizes the power consumption efficiency displayed by means of the operation button and presses the operation button in operation 850, the input reservation time is set and stored in the memory in operation 860.

According to the above-described electrical instrument and control method thereof, it is possible to provide a user interface that displays power rate information corresponding to each time period such that the user can intuitively determine power rates according to time and set a reservation time.

Furthermore, the user interface may calculate power rates estimated when the electrical instrument is driven for the reservation time and display the estimated power rates to the user upon setting of the reservation time.

Moreover, power consumption efficiency is determined in consideration of power rate variation during the reservation time and displayed by means of the operation button of the user interface such that the user intuitively recognizes the power consumption efficiency.

Therefore, it is possible to efficiently drive the electrical instrument and reduce power rates.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A method of controlling an electrical instrument to which a user inputs a reservation time using a rotary dial, the method comprising:
    upon reception of power rates by time periods from a power provider, confirming power rate levels by time periods based on the received power rates;
    displaying a clock window including the power rate levels by time periods around the rotary dial; and
    displaying the reservation time input by the user through the rotary dial on the clock window.

2. The method according to claim 1, wherein the clock window is segmented into regions respectively corresponding to the power rate levels by time periods and the segmented regions are respectively displayed in colors corresponding to the power rate levels.

3. The method according to claim 1, wherein the clock window has a circular or bar shape.

4. The method according to claim 1, further comprising:
    determining whether a plurality of reservation time periods is input;
    selecting one of the plurality of reservation time periods when it is determined that the plurality of reservation time periods are input; and
    displaying the selected reservation time.

5. The method according to claim 4, wherein the selecting of one of the plurality of reservation time periods comprises allowing the user to select one of the reservation time periods, comparing power rate levels corresponding to the plurality of reservation time periods and selecting a reservation time corresponding to a lower power rate level if the user does not select any reservation time.

6. The method according to claim 4, wherein the selecting of one of the plurality of reservation time periods comprises comparing power rate levels respectively corresponding to the plurality of reservation time periods and selecting a reservation time corresponding to a lower power rate level.

7. The method according to claim 1, further comprising calculating estimated power rates corresponding to the reservation time using previously stored instantaneous power amounts by operation time periods and the power rates by time periods and displaying the estimated power rates.

8. The method according to claim 7, wherein the calculating of the estimated power rates comprises:
    calculating a desired operation time on the basis of the reservation time;
    confirming instantaneous power amounts corresponding to the desired operation time;
    confirming power rates corresponding to the reservation time; and
    calculating the estimated power rates by adding up products of the instantaneous power amounts and power rates.

9. The method according to claim 1, further comprising:
    determining power consumption efficiency on the basis of a variation in the power rates by time periods during the reservation time according to a predetermined standard;
    determining a color corresponding to the determined power consumption efficiency; and
    displaying an operation button in the determined color.

10. The method according to claim 9, further comprising displaying the reservation time with the variation in the power rates by time periods.

11. The method according to claim 10, wherein the variation in the power rates by time periods is indicated by a bar graph that shows the power rates by time periods.

12. The method according to claim 9, wherein the displaying of the operation button in the color comprises displaying the entire operation button in the color or displaying only the edge of the operation button in the color.

13. The method according to claim 1, wherein the rotary dial is a jog dial or is displayed on a touchscreen.

14. An electrical instrument to which a reservation time is input using a rotary dial, comprising:
    a memory to store a list of power rate levels corresponding to power rates;
    a communication unit to receive power rates by time periods from a power provider;
    a controller to confirm power rate levels by time periods using a power rate level list when receiving the power rates by time periods from the communication unit; and
    a user interface to display the power rate levels by time periods on a clock window arranged around the rotary dial and display the reservation time input using the rotary dial on the clock window.

15. The electrical instrument according to claim 14, wherein the memory stores color information respectively corresponding to the power rate levels by time periods and the user interface displays the power rate levels by time periods on the clock window on the basis of the color information.

16. The electrical instrument according to claim 14, wherein the user interface has a circular or bar shape.

17. The electrical instrument according to claim 14, wherein the controller determines whether a plurality of reservation time periods is input and selects one of the plurality of reservation time periods when determining that the plurality of reservation time periods are input, and the user interface displays the selected reservation time.

18. The electrical instrument according to claim 17, wherein the controller compares power rate levels respectively corresponding to the plurality of reservation time periods and selects a reservation time corresponding to a lower power rate level.

19. The electrical instrument according to claim 14, wherein the controller determines whether a plurality of reservation time periods is input and allows a user to select one of the plurality reservation time periods when determining that the plurality of reservation time periods are input.

20. The electrical instrument according to claim 19, wherein the controller compares power rates levels respectively corresponding to the plurality of reservation time periods and selects a reservation time corresponding to a lower power rate level if no reservation time is selected from the plurality of reservation time periods through the user interface.

21. The electrical instrument according to claim 14, wherein the memory stores instantaneous power amounts by operation time periods, the controller calculates estimated power rates corresponding to the reservation time using the instantaneous power amounts and the power rates by time periods, and the user interface displays the estimated power rates.

22. The electrical instrument according to claim 21, wherein the controller calculates a desired operation time on the basis of the reservation time, confirms instantaneous power amounts corresponding to the desired operation time, confirms power rates corresponding to the reservation time, and calculates the estimated power rates by adding up products of the confirmed instantaneous power amounts and power rates.

23. The electrical instrument according to claim 14, wherein the controller determines power consumption efficiency on the basis of a variation in the power rates by time periods during the reservation time according to a predetermined standard.

24. The electrical instrument according to claim 23, wherein the memory stores color display information corresponding to the power consumption efficiency and the user interface displays an operation button in a color corresponding to the determined power consumption efficiency.

25. The electrical instrument according to claim 24, wherein the user interface displays the reservation time with the variation in the power rates by time periods.

26. The electrical instrument according to claim 25, wherein the variation in the power rates by time periods is indicated by a bar graph that shows the power rates by time periods.

27. The electrical instrument according to claim 24, wherein the user interface displays the entire operation button in the color corresponding to the power consumption efficiency or displays only the edge of the operation button in the color.

28. The electrical instrument according to claim 14, wherein the rotary dial is a jog wheel or is displayed on a touchscreen.

* * * * *